(12) United States Patent
Lu

(10) Patent No.: US 11,010,162 B2
(45) Date of Patent: May 18, 2021

(54) ELECTRONIC APPARATUS CAN EXECUTE INSTRUCTION AND INSTRUCTION EXECUTING METHOD

(71) Applicant: Realtek Semiconductor Corp., HsinChu (TW)

(72) Inventor: Yen-Ju Lu, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/574,062

(22) Filed: Sep. 17, 2019

(65) Prior Publication Data

US 2020/0326944 A1 Oct. 15, 2020

(30) Foreign Application Priority Data

Apr. 10, 2019 (TW) ................................ 108112408

(51) Int. Cl.
| | |
|---|---|
| *G06F 9/312* | (2018.01) |
| *G06F 12/0811* | (2016.01) |
| *G06F 12/0862* | (2016.01) |
| *G06F 9/30* | (2018.01) |
| *G06F 12/0802* | (2016.01) |

(52) U.S. Cl.
CPC ........ *G06F 9/30043* (2013.01); *G06F 9/3005* (2013.01); *G06F 9/3016* (2013.01); *G06F 9/30167* (2013.01); *G06F 12/0802* (2013.01); *G06F 12/0811* (2013.01); *G06F 12/0862* (2013.01)

(58) Field of Classification Search
CPC .. G06F 9/30043; G06F 9/3005; G06F 9/3016; G06F 9/30167; G06F 9/3824; G06F 9/383; G06F 9/3834; G06F 9/345; G06F 12/0862; G06F 12/0802; G06F 12/0811; G06F 12/0815; G06F 12/0848; G06F 12/12; G06F 9/3004
USPC ......... 712/203, 205–207, 213, 225; 711/117, 711/119, 122, 123, 133, 141–143, 159, 711/160
See application file for complete search history.

(56) References Cited

U.S. PATENT DOCUMENTS

| | | | | |
|---|---|---|---|---|
| 5,909,566 A | * | 6/1999 | Cai ....................... | G06F 9/3017 712/207 |
| 5,983,243 A | * | 11/1999 | Heiney ................. | G06F 40/174 715/235 |
| 6,408,345 B1 | * | 6/2002 | Fuoco .................... | G06F 13/28 710/22 |

(Continued)

FOREIGN PATENT DOCUMENTS

| | | |
|---|---|---|
| TW | 200912741 | 3/2009 |
| TW | 201743215 A | 12/2017 |

*Primary Examiner* — Daniel H Pan
(74) *Attorney, Agent, or Firm* — Winston Hsu

(57) ABSTRACT

An electronic device can execute instructions, comprising: a processing circuit; a first storage device, coupled to the processing circuit, configured to store at least one instruction and first operation data; and a second storage device, coupled to the processing circuit. The processing circuit reads at least one of the instruction and the first operation data corresponding to the read instruction from the first storage device, and the second storage device does not store the first operation data corresponding to the read instruction, the processing circuit backs up the read first operation data to the second storage device.

15 Claims, 6 Drawing Sheets

(56) References Cited

U.S. PATENT DOCUMENTS

| | | | |
|---|---|---|---|
| 6,484,237 B1* | 11/2002 | Agarwala | G06F 12/0831 |
| | | | 711/122 |
| 2007/0083735 A1* | 4/2007 | Glew | G06F 9/3885 |
| | | | 712/214 |

* cited by examiner

ELECTRONIC APPARATUS CAN EXECUTE INSTRUCTION AND INSTRUCTION EXECUTING METHOD

BACKGROUND OF THE INVENTION

1. Field of the Invention

The present invention relates to an electronic apparatus and an instruction executing method, and particularly relates to an electronic apparatus and an instruction executing method which can increase operation data reading efficiency.

2. Description of the Prior Art

Conventionally, when a processor executes instructions, the processor needs to read operation data or literal data (constant) corresponding to the instructions. However, the literal data (constant) and the instructions may be stored in the same storage device, thus reading operations thereof may conflict. Accordingly, the execution of instructions may be affected.

SUMMARY OF THE INVENTION

One objective of the present invention is to provide an electronic device can execute instructions, which can improve the conventional issue occurs while reading the instructions and literal data (constant) at the same time.

Another objective of the present invention is to provide an electronic device can execute instructions, which can improve the conventional issue occurs while reading the instructions and literal data (constant) at the same time.

On embodiment of the present invention discloses an electronic device can execute instructions, comprising: a processing circuit; a first storage device, coupled to the processing circuit, configured to store at least one instruction and first operation data; and a second storage device, coupled to the processing circuit. The processing circuit reads at least one of the instruction and the first operation data corresponding to the read instruction from the first storage device, and the second storage device does not store the first operation data corresponding to the read instruction, the processing circuit backs up the read first operation data to the second storage device.

Another embodiment of the present invention discloses an instruction executing method applied to an electronic device comprising a processing circuit a first storage device and a second storage device, comprising: reading at least one of the instruction and the first operation data corresponding to the read instruction from the first storage device by the processing circuit; and determining if the second storage device stores the first operation data corresponding to the read instruction, and backing up the read first operation data to the second storage device when the second storage device does not store the first operation data corresponding to the read instruction.

Based upon above-mentioned embodiments, the instructions and the literal data (constant) can be stored in different storage devices, thus a conventional issue that the reading operations may conflict thus affect the execution of instructions can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concepts of the present invention. Components in each embodiment can be implemented by hardware (e.g. circuit or device) or by firmware (e.g. a processor with at least one program). Additionally, under the premise that components in each embodiment have the same function, the components can be separated into more components or integrated to fewer components. Besides, the "first", "second" in the present invention are only for defining different components or steps, but do not mean the sequence thereof.

Figure 1:
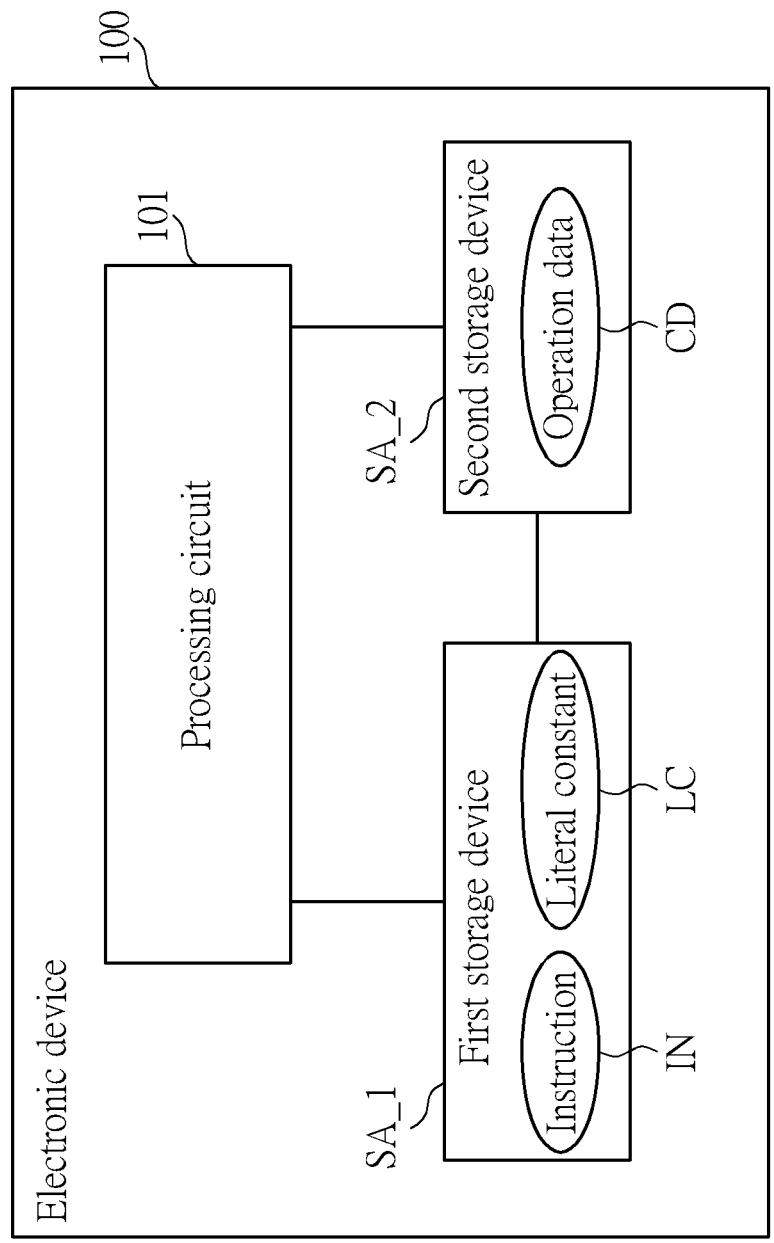
FIG. 1 is a block diagram illustrating an electronic device according to one embodiment of the present invention.

FIG. 1 is a block diagram illustrating an electronic device according to one embodiment of the present invention. As illustrated in FIG. 1, the electronic device comprises a processing circuit 101, a first storage device SA_1 and a second storage device SA_2. The processing circuit 101 is respectively coupled to the first storage device SA_1 and the second storage device SA_2. The first storage device SA_1 is configured to store instruction IN and literal data (constant) LC, and the second storage device SA_2 is configured to store operation data CD. The instruction IN comprises at least one instruction, the literal data (constant) LC comprises at least one literal data (constant), and the operation data CD comprises at least one piece of operation data. In one embodiment, the processing circuit 101 is a processor, and the first storage device SA_1 or the second storage device SA_2 can be a device having storage function, such as a register, a memory an optical disc or a hard disk.

Figure 2:
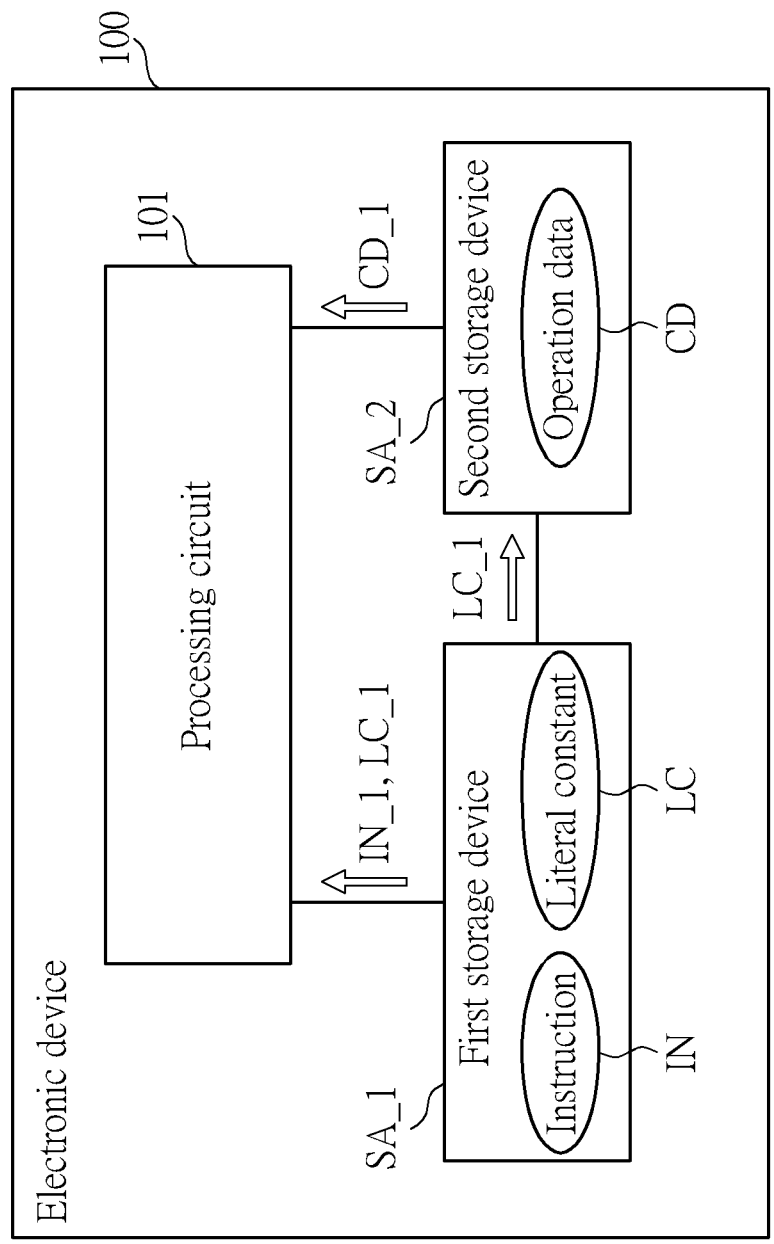
FIG. 2 and FIG. 3 are schematic diagrams illustrating operations of the electronic device illustrated in FIG. 1.
Figure 3:
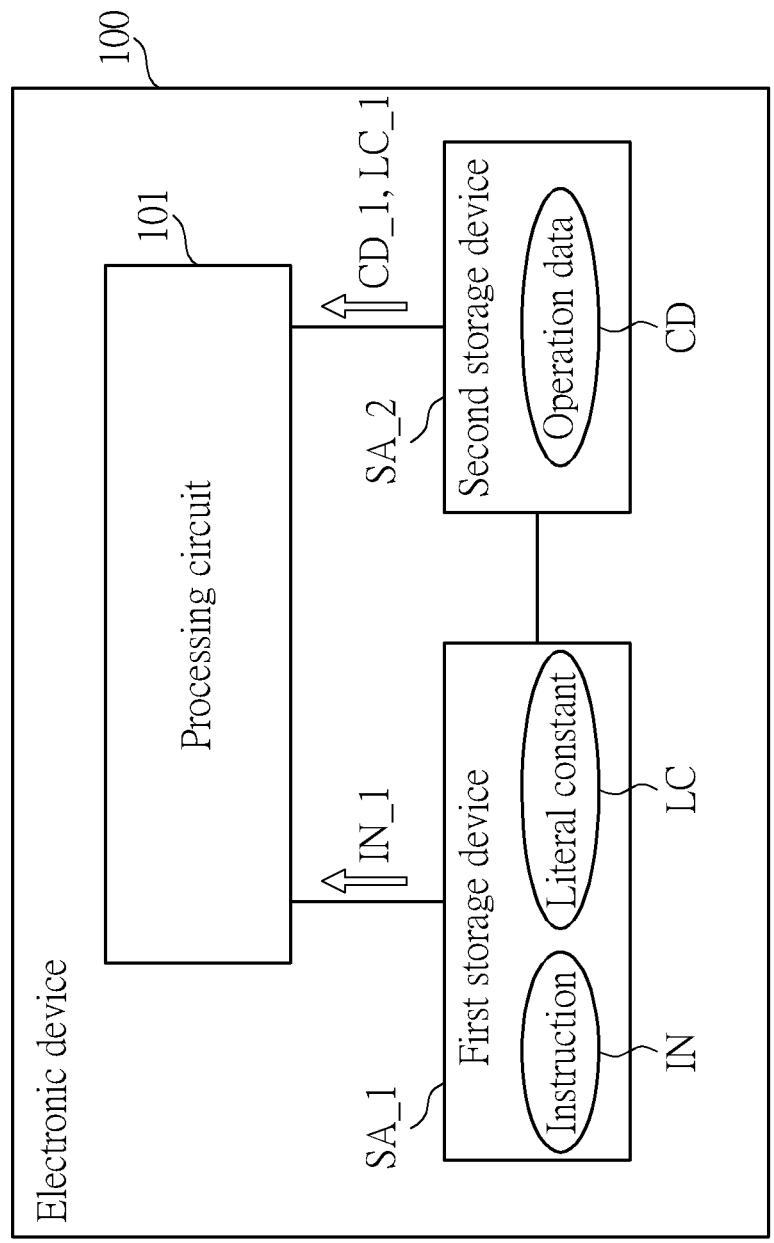

FIG. 2 and FIG. 3 are schematic diagrams illustrating operations of the electronic device illustrated in FIG. 1. As shown in FIG. 2, when the processing circuit 101 is to execute the instruction IN_1, the instruction IN_1 is read from the first storage device SA_1. Also, when the literal data (constant) LC_1 needs to be read while the read instructionIN_1 being executed, the processing circuit 101 determines if the literal data (constant) LC_1 corresponding to the instruction IN_1 exists in the second storage device SA_2. If not, the processing circuit 101 reads the corresponding literal data (constant) LC_1 from the first storage device SA_1 as shown in FIG. 2, and copies the literal data (constant) LC_1 to the second storage device SA_2. If the operation data CD_1 needs to be read while the read instruction IN _1 being executed, the processing circuit 101 reads the operation data CD_1 corresponding to the instruction IN_1 from the second storage device SA_2. The instruction IN_1, the literal data (constant) LC_1, and the operation data CD_1 may be respectively partial or all of the instruction IN, the literal data (constant) LC, and the operation data CD. In an embodiment, only one of the literal data (constant) LC_1 and the operation data CD_1 needs to be read when the read instruction IN_1 is executed.

If the second storage device SA_2 already stores the literal data (constant) LC_1 corresponding to the instruction IN_1, or the processing circuit 101 executes the instruction IN_1 again after the operations in FIG. 2, the processing circuit reads the instruction IN_1 from the first storage device SA_1 but reads the literal data (constant) LC_1 from the second storage device SA_2 as illustrated in FIG. 3, rather than read the literal data (constant) LC_1 from the first storage device SA_1 as shown in FIG. 2. In FIG. 3, if the operation data CD_1 needs to be read when the read instruction IN_1 is executed, the processing circuit 101 reads the operation data CD 1 corresponding to the instruction IN_1 from the second storage device SA_2.

In one embodiment, the operation data CD is a variable in a program. The following codes are from an example of the instruction IN, the literal data (constant) LC, and the operation data CD to calculate a circle area a. Please also note that the instruction IN, the literal data (constant) LC, and the operation data CD are not limited to the examples below.

Main ( ) {
int r;
int a;
input r;
load r;
a=πr$^2$
output

In the above-mentioned example, r is the aforementioned operation data CD, which may vary due to different input values.int, input, load, and output are all instructions, and π is the aforementioned literal data (constant), which is a fixed value.

Figure 4:
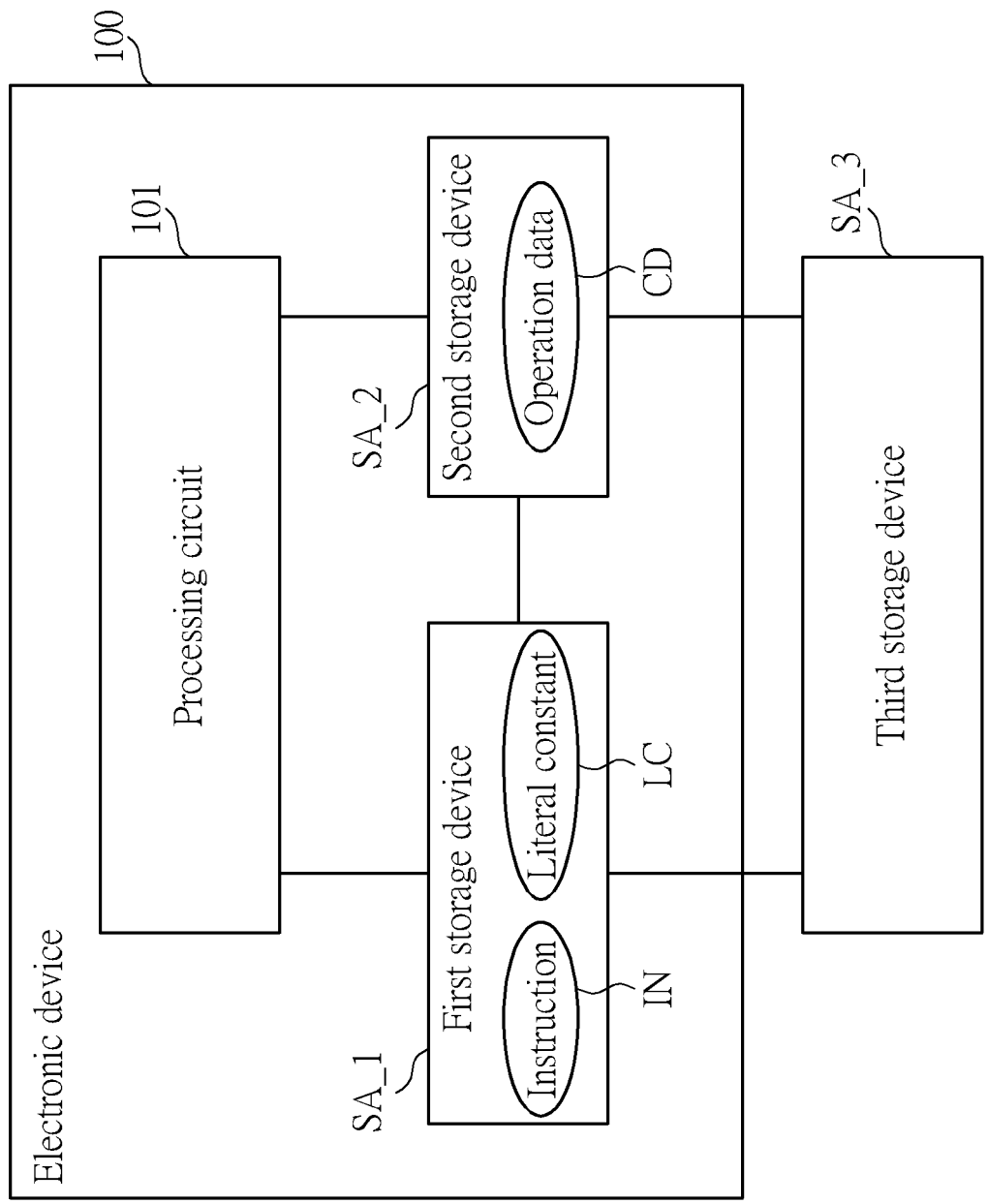
FIG. 4 is a block diagram illustrating an electronic device according to another embodiment of the present invention.

As described above, the first storage device SA_1 and the second storage device SA_2 may be various types of storage devices. In one embodiment, the first storage device SA_1 and the second storage device SA_2 are cache memories for temporarily storing data from other storage devices. FIG. 4 is a block diagram illustrating an electronic device according to another embodiment of the present invention. As shown in FIG. 4, the first storage device SA_1 and the second storage device SA_2 are coupled to a third storage device SA_3. The access speed of the third storage device SA_3 is lower than the access speeds of the first storage device SA_1 and the second storage device SA_2. For example, the first storage device SA_1 and the second storage device SA_2 are cache memories and the third storage device SA_3 is a dynamic memory (DRAM) or a hard disk. The third storage device SA_3 may be located outside the electronic device 100 as shown in FIG. 4, but may also be located in the electronic device 100.

Before the processing circuit 101 reads any instruction in the instructions IN and any literal data (constant) in the literal data (constant) LC from the first storage device SA_1, the processing circuit 101 copies the instruction to be read from the third storage device SA_3 and the literal data (constant) to be read to the first storage device SA_1. In addition, before the processing circuit 101 reads any of the operation data in the operation data CD from the second storage device SA_2, the processing circuit 101 copies the operation data to be read from the third storage device SA_3 to the second storage device SA_2. In other words, the processing circuit 101 temporarily stores part of the data from the third storage device SA_3 to the first storage device SA_1 or the second storage device SA_2 to speed up the read speed.

Figure 5:
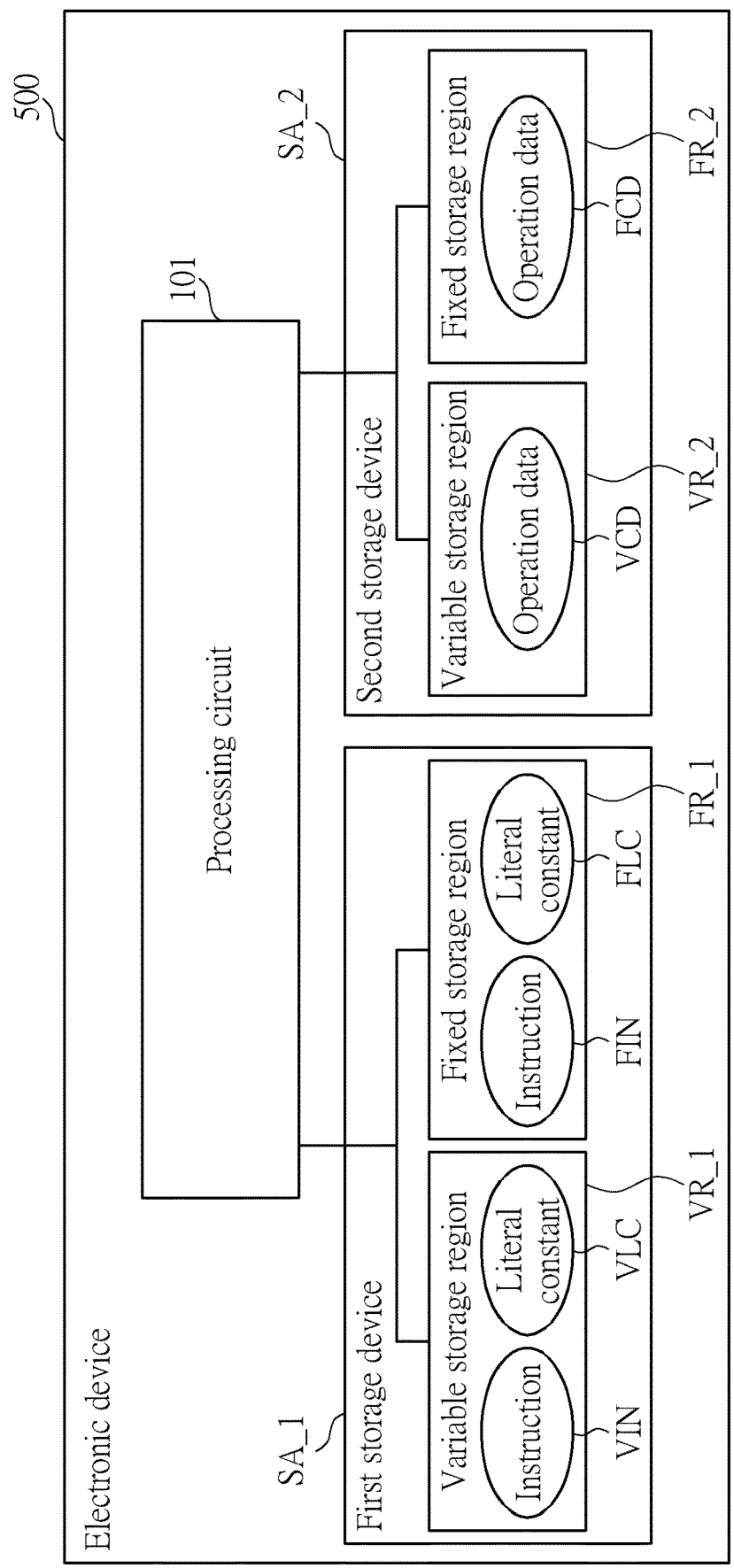
FIG. 5 and FIG. 6 are block diagrams illustrating more detail structures for the electronic device according to the embodiment of the present invention.

In one embodiment, the first storage device SA_1 and the second storage device SA_2 further comprise a plurality of storage regions. As shown in FIG. 5, the electronic device 500 also comprises a first storage device SA_1 and a second storage device SA_1. The first storage device SA_1 comprises a variable storage region VR_1 and a fixed storage region FR_1, and the second storage device SA_2 comprises a variable storage region VR_2 and a fixed storage region FR_2. The fixed storage region FR_1 stores fixed instruction FIN and literal data (constant) FLC, and the variable storage region VR_1 stores variable instruction VIN. For example, when a new instruction is written to the variable storage region VR_1 and the storage space is insufficient, the old instructions are first removed to release the storage space. The fixed storage region FR_2 stores fixed operation data FCD, and the variable storage region VR_2 stores variable operation data VCD. For example, when new operation data is to be written into the variable storage region VR_2 and the storage space is insufficient, the old operation data is first removed to release the storage space. If the structure of FIG. 5 is used in the embodiment of FIG. 2, the processing circuit 101 will back up the read literal data (constant) LC_1 to the variable storage region VR_2.

Figure 6:
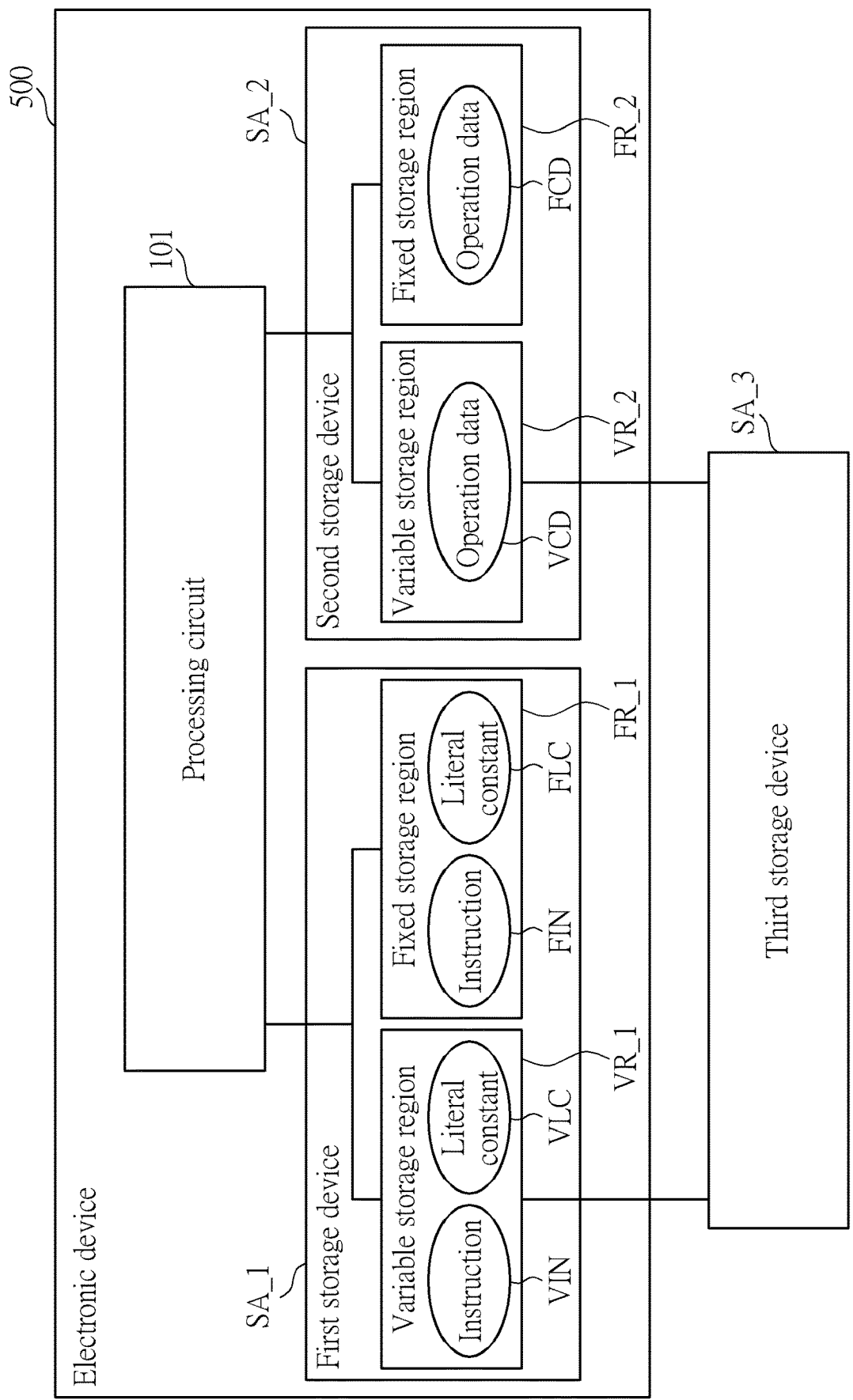

In one embodiment, the first storage device SA_1 and the second storage device SA_2 are cache memories for temporarily storing data from other storage devices. FIG. 6 is a block diagrams illustrating more detail structures for the electronic device according to the embodiment of the present invention. As shown in FIG. 6, the variable storage region VR_1 of the first storage device SA_1 and the variable storage region VR_2 of the second storage device SA_2 are coupled to the third storage device SA_3. The access speed of the third storage device SA_3 is lower than the access speeds of the first storage device SA_1 and the second storage device SA_2. For example, the first storage device SA_1 and the second storage device SA_2 are cache memories and the third storage device SA_3 is a dynamic memory (DRAM) or a hard disk. The third storage device SA_3 may be located outside the electronic device 100 as shown in FIG. 6, but may also be located in the electronic device 100.

Before the processing circuit 101 reads any instruction in the instruction IN of FIG. 1 and any literal data (constant) in the literal data (constant) LC in FIG. 1 from the first storage device SA_1, the processing circuit 101 copies the instruction to be read and the literal data (constant) to be read from the device SA_3 from the third storage to the variable storage region VR_1. In addition, before the processing circuit 101 reads any operation data in the operation data CD in FIG. 1 from the second storage device SA_2, the processing circuit 101 copies the operation data to be read from the third storage device SA_3 to the variable storage region VR_2. In other words, the processing circuit 101 temporarily stores partial of the data from the third storage device SA_3 to the first storage device SA_1 or the second storage device SA_2 to speed up the reading speed.

The above-mentioned mechanism can be applied to operation data besides the literal data (constant). The operation data mentioned here is different from the above-mentioned operation data CD. Therefore, in view of above-mentioned embodiments, the electronic device provided by the present invention can be summarized as:

An electronic device can execute instructions, comprising: a processing circuit (e.g. 101 in FIG. 1); a first storage device (e.g. SA_1 in FIG. 1), coupled to the processing circuit, configured to store at least one instruction (e.g. IN in FIG. 1) and first operation data (e.g. literal data (constant) LC in FIG. 1 or other operation data); and a second storage device (e.g. SA_2 in FIG. 1), coupled to the processing circuit. When the processing circuit reads at least one of the instruction and the first operation data corresponding to the read instruction from the first storage device, and the second storage device does not store the first operation data corresponding to the read instruction, the processing circuit backs up the read first operation data to the second storage device. The second storage device can store second operation data, such as operation data CD in FIG. 2. A corresponding instruction executing method can also be acquired, and the steps thereof can be easily acquired in view of above-mentioned embodiments, thus are omitted for brevity here.

Based upon above-mentioned embodiments, the instructions and the literal data (constant) can be stored in different storage devices, thus a conventional issue that the reading operations may conflict thus affect the execution of instructions can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device can execute instructions, comprising:
   a processing circuit;
   a first storage device, coupled to the processing circuit, configured to store at least one instruction and first operation data; and
   a second storage device, coupled to the processing circuit;
   wherein when the processing circuit reads at least one of the instruction and the first operation data corresponding to the read instruction from the first storage device, and the second storage device does not store the first operation data corresponding to the read instruction, the processing circuit backs up the read first operation data to the second storage device;
   wherein when the processing circuit needs to read the first operation data corresponding to the read instruction again, the processing circuit reads the first operation data corresponding to the read instruction from the second storage device rather than from the first storage device;
   wherein the second storage device is further configured to store second operation data, wherein when the processing circuit reads at least one the instruction from the first storage device, the processing circuit reads the second operation data corresponding to the read instruction from the second storage device;
   wherein the first operation data comprises at least one literal data (constant).

2. The electronic device of claim 1, wherein the second storage device is a cache memory, wherein the processing circuit copies the instruction from a third storage device to the first storage device before the processing circuit reads the second operation data from the second storage device, wherein an access speed of the third storage device is lower than which of the second storage device.

3. The electronic device of claim 1, wherein the second storage device comprises a fixed storage region storing the second operation data which is fixed and a variable storage region storing the second operation data which is variable, wherein the processing circuit backs up the read first operation data to the variable storage region of the second storage device.

4. The electronic device of claim 1, wherein the processing circuit simultaneously reads the first operation data corresponding to the read instruction and the second operation data corresponding to the read instruction from the second storage device.

5. The electronic device of claim 1, wherein the first storage device is a cache memory, wherein the processing circuit copies the instruction and the first operation data from a third storage device to the first storage device before the processing circuit reads the instruction and the first operation data from the first storage device, wherein an access speed of the third storage device is lower than which of the first storage device.

6. The electronic device of claim 1, wherein the first storage device comprises a fixed storage region storing the instruction which is fixed and the first operation data which is fixed, and comprising a variable storage region storing the instruction which is variable.

7. The electronic device of claim 1, wherein the processing circuit is a processor.

8. An instruction executing method applied to an electronic device comprising a processing circuit a first storage device and a second storage device, comprising:
   reading at least one of the instruction and the first operation data corresponding to the read instruction from the first storage device by the processing circuit;
   determining if the second storage device stores the first operation data corresponding to the read instruction, and backing up the read first operation data to the second storage device when the second storage device does not store the first operation data corresponding to the read instruction; and
   reading the first operation data corresponding to the read instruction from the second storage device rather than from the first storage device by the processing circuit, when the processing circuit reads the first operation data corresponding to the read instruction again;
   wherein the second storage device is further configured to store second operation data, and the instruction executing method further comprising:
   reading the second operation data corresponding to the read instruction from the second storage device by the processing circuit, when the processing circuit reads at least one the instruction from the first storage device, wherein the first operation data comprises at least one literal data (constant).

9. The instruction executing method of claim 8, wherein the second storage device is a cache memory, further comprising:
   copying the instruction from a third storage device to the first storage device by the processing circuit before the processing circuit reads the second operation data from the second storage device, wherein an access speed of the third storage device is lower than which of the second storage device.

10. The instruction executing method of claim 8, wherein the second storage device comprises a fixed storage region storing the second operation data which is fixed and a variable storage region storing the second operation data which is variable, further comprising:
    backing up the read first operation data to the variable storage region of the second storage device by the processing circuit.

11. The instruction executing method of claim 8, further comprising:
    simultaneously reading the first operation data corresponding to the read instruction and the second operation data corresponding to the read instruction from the second storage device by the processing circuit.

12. The instruction executing method of claim 8, wherein the first storage device is a cache memory, further comprising:

copying the instruction and the first operation data from a third storage device to the first storage device by the processing circuit, before the processing circuit reads the instruction and the first operation data from the first storage device, wherein an access speed of the third storage device is lower than which of the first storage device.

13. The instruction executing method of claim 8, wherein the first storage device comprises a fixed storage region storing the instruction which is fixed and the first operation data which is fixed, and comprising a variable storage region storing the instruction which is variable.

14. The instruction executing method of claim 8, wherein the processing circuit is a processor.

15. An electronic device can execute instructions, comprising:
    a processing circuit;
    a first storage device, coupled to the processing circuit, configured to store at least one instruction and first operation data; and
    a second storage device, coupled to the processing circuit;
    wherein when the processing circuit reads at least one of the instruction and the first operation data corresponding to the read instruction from the first storage device, and the second storage device does not store the first operation data corresponding to the read instruction, the processing circuit backs up the read first operation data to the second storage device;
    wherein the first storage device comprises a fixed storage region storing the instruction which is fixed and the first operation data which is fixed, and comprising a variable storage region storing the instruction which is variable.

* * * * *